United States Patent
Kondou et al.

(10) Patent No.: US 7,322,184 B2
(45) Date of Patent: Jan. 29, 2008

(54) ESTIMATION OF PARTICULATE MATTER DEPOSIT AMOUNT IN DIESEL PARTICULATE FILTER

(75) Inventors: Terunori Kondou, Yokohama (JP); Junichi Kawashima, Yokosuka (JP); Naoya Tsutsumoto, Yokohama (JP); Makoto Ootake, Yokohama (JP); Shouichirou Ueno, Yokohama (JP); Masahiko Nakano, Machida (JP); Toshimasa Koga, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 237 days.

(21) Appl. No.: 11/197,527

(22) Filed: Aug. 5, 2005

(65) Prior Publication Data

US 2006/0026950 A1 Feb. 9, 2006

(30) Foreign Application Priority Data

Aug. 6, 2004 (JP) .............................. 2004-230711

(51) Int. Cl.
*F01N 3/00* (2006.01)
*F01N 3/02* (2006.01)

(52) U.S. Cl. .......................................... 60/297; 60/311

(58) Field of Classification Search ................. 60/297, 60/311

See application file for complete search history.

(56) References Cited

U.S. PATENT DOCUMENTS

| 6,698,192 | B2 | 3/2004 | Ootake | |
| 6,758,039 | B2 * | 7/2004 | Kuboshima et al. | 60/311 |
| 7,028,467 | B2 * | 4/2006 | Kuboshima et al. | 60/297 |
| 7,147,688 | B2 * | 12/2006 | Kondou et al. | 95/1 |
| 2004/0123586 | A1 * | 7/2004 | Kuboshima et al. | 60/277 |
| 2006/0032217 | A1 * | 2/2006 | Kondou et al. | 60/297 |
| 2006/0042237 | A1 * | 3/2006 | Nonoyama et al. | 60/297 |
| 2006/0260298 | A1 * | 11/2006 | Iida | 60/297 |

FOREIGN PATENT DOCUMENTS

JP 08-109818 A 4/1996

* cited by examiner

*Primary Examiner*—Thomas Denion
*Assistant Examiner*—Loren Edwards
(74) *Attorney, Agent, or Firm*—Foley & Lardner LLP (57) ABSTRACT

A particulate matter deposit amount in a diesel particulate filter (4) provided in an exhaust passage (3) of a diesel engine (1) for a vehicle is estimated on the basis of a pressure loss in the filter (4), which is detected by a differential pressure sensor (12). When the temperature of the differential pressure sensor (12) is not within a predetermined temperature range, estimation of the particulate matter deposit amount based on the pressure loss is restricted, and instead, the particulate matter deposit amount is estimated by accumulating a particulate matter deposit amount per unit time. In so doing, increases in the estimation error outside of the predetermined temperature range are prevented. Moreover, by applying these estimation methods selectively in accordance with the vehicle speed, the precision with which the particulate matter deposit amount is estimated outside of the predetermined temperature range is improved.

11 Claims, 9 Drawing Sheets

ESTIMATION OF PARTICULATE MATTER DEPOSIT AMOUNT IN DIESEL PARTICULATE FILTER

FIELD OF THE INVENTION

This invention relates to a diesel particulate filter which traps particulate matter discharged by a diesel engine, and more particularly to estimation of a particulate matter deposit amount in the filter.

BACKGROUND OF THE INVENTION

Tokkai Hei8-109818, published by the Japan Patent Office in 1996, discloses a method of estimating a trapped particulate matter amount in order to regenerate a diesel particulate filter (hereafter referred to as DPF).

The DPF is provided in an exhaust passage of a diesel engine to trap particulate matter contained in the exhaust gas that is discharged from the diesel engine. When the DPF traps a predetermined amount of particulate matter, the trapped particulate matter is burned by means of an operation to raise the temperature of the DPF, whereupon the DPF is once again able to trap particulate matter. This process is known as DPF regeneration. The DPF temperature is raised by manipulating the fuel injection amount or injection timing of the diesel engine, or by heating the DPF using a heating device.

The determination as to whether or not to regenerate the DPF is made on the basis of the amount of particulate matter deposited in the DPF. In the prior art, the particulate matter deposit amount is estimated on the basis of pressure loss generated in the exhaust gas flow by the DPF. More specifically, a differential pressure between the pressure of the exhaust passage upstream of the DPF and the pressure of the exhaust passage downstream of the DPF is detected by a differential pressure sensor, and when the differential pressure reaches a predetermined value, it is determined that a predetermined amount of particulate matter is trapped in the DPF.

Regardless of the method that is applied to regenerate the DPF, more energy is consumed during regeneration to increase the temperature of the DPF than during non-regeneration periods. Hence, if the particulate matter deposit amount in the DPF is estimated to be larger than the actual deposit amount, the regeneration frequency increases, leading to an increase in energy consumption. If the particulate matter deposit amount in the DPF is estimated to be smaller than the actual deposit amount, the actual particulate matter deposit amount in the DPF exceeds the predetermined amount, and hence the temperature of the DPF must be raised excessively in order to burn the large amount of particulate matter during regeneration, thereby reducing the life of the DPF.

To regenerate the DPF appropriately, the differential pressure must be detected with a high degree of precision. For this purpose, the prior art proposes correcting the value of the differential pressure, detected by the differential pressuresensor, in accordance with the exhaust gas flow rate and DPF temperature.

SUMMARY OF THE INVENTION

According to an experiment performed by the inventors, the precision with which the differential pressure is detected by the differential pressure sensor depends on the ambient temperature of the differential pressure sensor as well as the exhaust gas flow rate and DPF temperature.

It is therefore an object of this invention to increase the precision with which a differential pressure is detected by a differential pressure sensor by incorporating the ambient temperature of the differential pressure sensor into parameters relating to detection of the differential pressure.

In order to achieve the above object, this invention provides a estimation device which estimates a particulate matter deposit amount in a diesel particulate filter provided in an exhaust passage of a diesel engine. The estimation device comprises a differential pressure sensor which detects a pressure loss generated by the filter in an exhaust gas in the exhaust passage, and a programmable controller. The controller is programmed to estimate the particulate matter deposit amount on the basis of the pressure loss, determine whether or not a temperature of the differential pressure sensor is within a predetermined range, and restrict estimation of the particulate matter deposit amount based on the pressure loss, when the temperature of the differential pressure sensor is not within the predetermined range.

This invention also provides an estimation method comprising detecting a pressure loss generated by the filter in an exhaust gas in the exhaust passage, estimating the particulate matter deposit amount on the basis of the pressure loss, determining whether or not a temperature of the differential pressure sensor is within a predetermined range, and restricting estimation of the particulate matter deposit amount based on the pressure loss, when the temperature of the differential pressure sensor is not within the predetermined range.

The details as well as other features and advantages of this invention are set forth in the remainder of the specification and are shown in the accompanying drawings.

DESCRIPTION OF THE PREFERRED EMBODIMENTS

Figure 1:
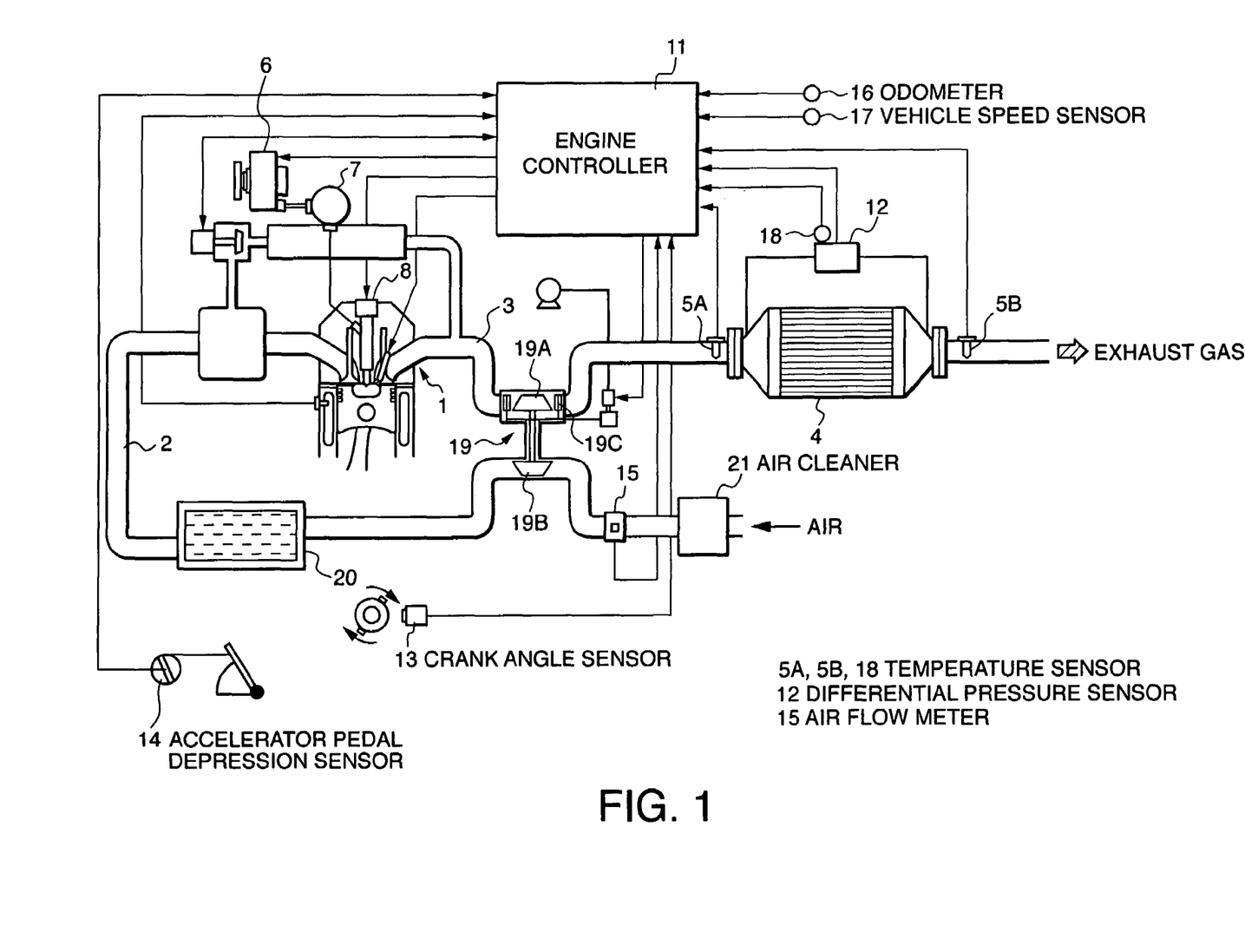
FIG. 1 is a schematic block diagram of a DPF regeneration device to which this invention is applied.

Referring to FIG. 1 of the drawings, a diesel engine 1 for driving a vehicle is provided with an intake passage 2 which aspirates air, and an exhaust passage 3 which discharges exhaust gas. The intake passage 2 and exhaust passage 3 are connected to plural combustion chambers of the diesel engine 1. The diesel engine 1 is provided with an air cleaner 18 in the intake passage 2 which removes dirt from air taken in from the outside, a compressor 19B of a turbocharger 19 which pressurizes the intake air, and an intercooler 20 which cools the intake air. The diesel engine 1 is provided with a fuel injector 8 which injects fuel into the air from the intake passage 2 in the upper part of each combustion chamber. Fuel is supplied to the fuel injector 8 via a common-rail 7 from a supply pump 6.

The diesel engine 1 is provided with a turbine 19A of the turbocharger 19, and a DPF 4 in the exhaust passage 3 which traps particulate matter in the exhaust gas. The compressor 19B and the turbine 19A of the turbocharger 19 rotate together on a common rotation axis, and due to the rotation of the compressor 19B via the turbine 19A with the energy of the exhaust gas of the exhaust passage 3, compressed air is supplied to the diesel engine 1.

The turbine 19A has a "variable geometry system" wherein the cross-sectional surface area of the exhaust gas flow is throttled at low rotation speed using a variable nozzle 19C so as to maintain exhaust gas pressure. The variable nozzle 19C is driven via a diaphragm actuator according to a negative pressure.

The fuel injection amount and injection timing of the fuel injector 8, and the supply of negative pressure to the diaphragm actuator which drives the variable nozzle 19C, are respectively controlled by output signals from an engine controller 11.

The engine controller 11 comprises a microcomputer comprising a central computing unit (CPU), read-only memory (ROM), random access memory (RAM), and input/output interface (I/O interface). The controller may also comprise plural microcomputers.

For these controls, various sensors are provided, and detection data are inputted into the engine controller 11 via signal circuits.

These sensors include but are not limited to a crank angle sensor 13 which detects a crank angle of the diesel engine 1, an air flow meter 15 which detects an intake flowrate of the intake passage 2, a differential pressure sensor 12 which detects a differential pressure ΔP between upstream and downstream of the DPF 4, an accelerator pedal depression sensor 14 which detects a depression amount of an accelerator pedal with which the vehicle is provided, an odometer 16 which detects a running distance of the vehicle, a temperature sensor 5A which detects an inlet temperature of the DPF 4, a temperature sensor 5B which detects an outlet temperature of the DPF 4, a vehicle speed sensor 17 which detects a vehicle speed VSP, and a temperature sensor 18 which detects an ambient temperature Ts of the differential pressure sensor 12. The differential pressure ΔP upstream and downstream of the DPF 4 corresponds to a pressure loss promoted by the DPF 4. The ambient temperature Ts denotes a temperature of atmosphere surrounding the differential pressure sensor 12.

Regarding the fuel injection amount of the fuel injector 8, to prevent a large amount of smoke from being generated near full load of the diesel engine 1, a maximum injection amount is set beforehand as the fuel injection amount of the fuel injector 8 based on the intake air volume Q of each cylinder of the diesel engine 1 calculated from the air flowrate of the intake passage 2, and the rotation speed N calculated from the crank angle of the diesel engine 1.

The controller 11 calculates a basic fuel injection amount of the fuel injector 8 based on the accelerator pedal depression amount, adds a limit depending on the maximum injection amount to the basic fuel injection amount, and controls the fuel injection amount and fuel injection timing by outputting a pulse signal equivalent to the value after limitation to the fuel injector 8.

Regarding the regeneration of the DPF 4, the engine controller 11 calculates a particulate matter deposit amount of the DPF 4, and if the calculated value becomes equal to or greater than a reference value at which regeneration should be performed, starts regeneration of the DPF 4.

As stated above, regeneration of the DPF 4 is performed by raising the temperature of the exhaust gas by a method known in the art such as retarding the fuel injection timing of the fuel injector 8 or performing a post-injection after the main injection.

The particulate matter deposit amount estimation device according to this invention is constituted by the engine controller 11 and the various sensors described above.

Basically, the engine controller 11 estimates the particulate matter deposit amount in the DPF 4 on the basis of pressure loss in the DPF 4. The pressure loss in the DPF 4 is equal to the differential pressure detected by the differential pressure sensor 12.

Here, the differential pressure sensor has a unique characteristic whereby the differential pressure detection precision deteriorates as the exhaust gas flow rate decreases. Hence, in the diesel engine 1 for use in a vehicle, the differential pressure detection error tends to increase as the vehicle speed decreases.

According to research undertaken by the inventors, the differential pressure detection precision of the differential pressure sensor is also affected by the ambient temperature of the differential pressure sensor.

Figure 4:
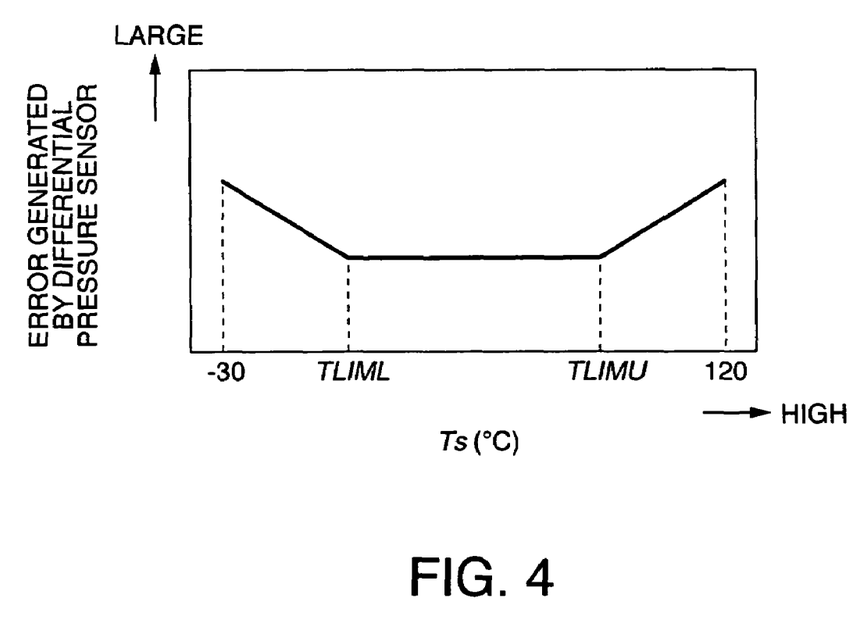
FIG. 4 is a diagram illustrating a relationship between an ambient temperature Ts and a detection error of the differential pressure sensor.

Referring to FIG. 4, the differential pressure detection precision deteriorates in a low temperature region where the ambient temperature of the differential pressure sensor is equal to or lower than a first predetermined temperature TLIML, and a high temperature region where the ambient temperature of the differential pressure sensor is equal to or higher than a second predetermined temperature TLIMU. It was determined through experiment that the first predetermined temperature TLIML is in the vicinity of zero degrees centigrade, and the second predetermined temperature TLIMU is in the vicinity of ninety degrees centigrade.

In consideration of this unique detection precision characteristic of the differential pressure sensor, the particulate matter deposit amount estimation device limits the operating regions in which the particulate matter deposit amount is estimated on the basis of the differential pressure. When the particulate matter deposit amount is not estimated on the basis of the differential pressure, the estimation device estimates the particulate matter deposit amount using an accumulation method.

The differential pressure method and accumulation method serving as methods of estimating the particulate matter deposit amount will now be described.

The differential pressure method is a method of estimating the particulate matter deposit amount from a differential pressure $\Delta P$ upstream and downstream of the DPF 4.

Figure 9:
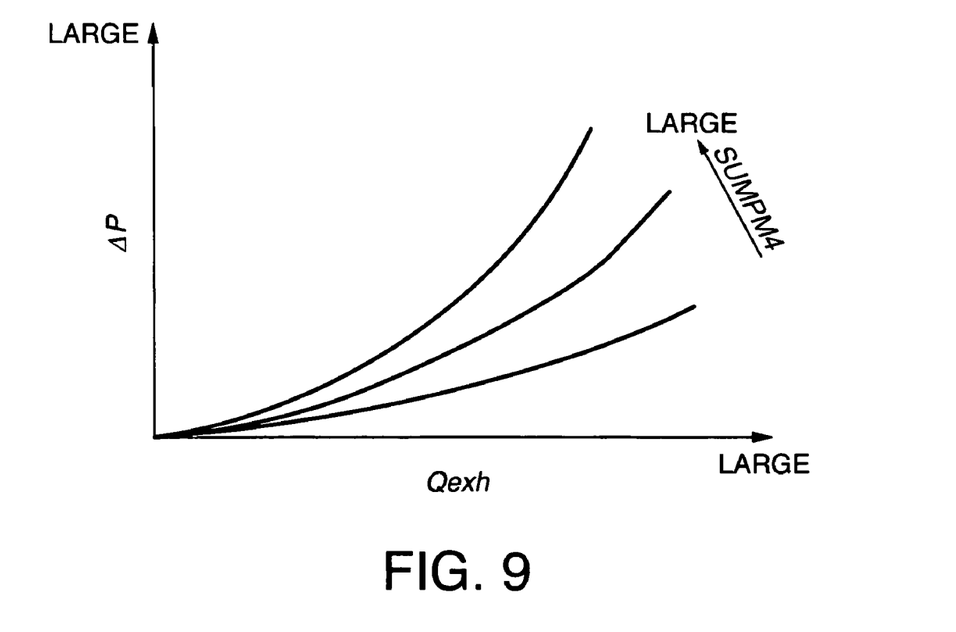
FIG. 9 is a diagram illustrating the characteristics of a map of a particulate matter deposit amount SUMPM2, stored by the controller.

As shown in FIG. 9, the particulate matter deposit amount in the DPF 4 may be expressed as a function having the differential pressure $\Delta P$ upstream and downstream of the DPF 4 and an exhaust gas flow rate Qexh of the DPF 4 as parameters. When the exhaust gas flow rate Qexh is constant, the differential pressure $\Delta P$ rises in accordance with increases in the particulate matter deposit amount. Hence, the particulate matter deposit amount can be determined from the differential pressure $\Delta P$ and exhaust gas flow rate Qexh using a map having characteristics such as those shown in FIG. 9, which defines in advance the relationship between the exhaust gas flow rate Qexh and differential pressure $\Delta P$ in relation to a plurality of different particulate matter deposit amounts. This estimation method will be referred to as the differential pressure method.

The exhaust gas flow rate Qexh is calculated from the intake air flow rate, detected by the air flow meter 15, the exhaust gas temperature inside the DPF 4, the differential pressure $\Delta P$, and the fuel injection amount Q of the diesel engine 1. A method of calculating the exhaust gas flow rate Qexh using these parameters is well-known from U.S. Pat. No. 6,698,192. The exhaust gas temperature in the DPF 4 is determined as an average value of the temperatures detected by the upstream temperature sensor 5A and downstream temperature sensor 5B.

Figure 8:
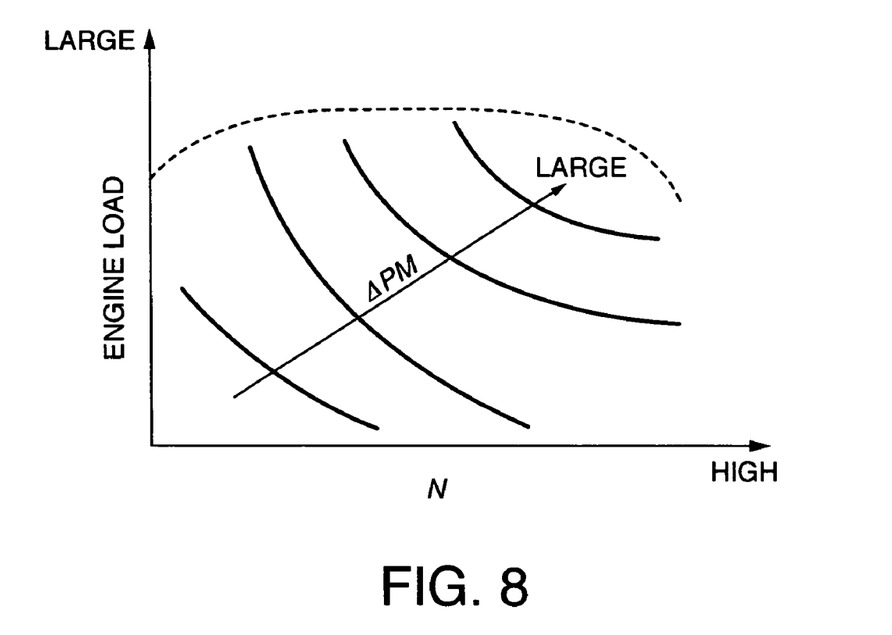
FIG. 8 is a diagram illustrating the characteristics of a map of a particulate matter discharge amount $\Delta PM$ per unit time, stored by the controller.

The accumulation method is a method of calculating the particulate matter deposit amount by accumulating particulate matter deposit amounts per unit time, which is determined according to the running conditions of the diesel engine 1. The load and rotation speed N of the diesel engine 1 are applied as the running conditions. The particulate matter deposit amount in the DPF 4 per unit time is calculated using a map having the characteristics shown in FIG. 8, which defines in advance the relationship between the load and rotation speed N of the diesel engine 1 and the particulate matter deposit amount in the DPF 4 per unit time. The load of the diesel engine 1 can be represented by the fuel injection amount Q or the accelerator pedal depression amount Both the differential pressure method and the accumulation method are well-known as methods of estimating the particulate matter deposit amount in a DPF.

Figure 3:
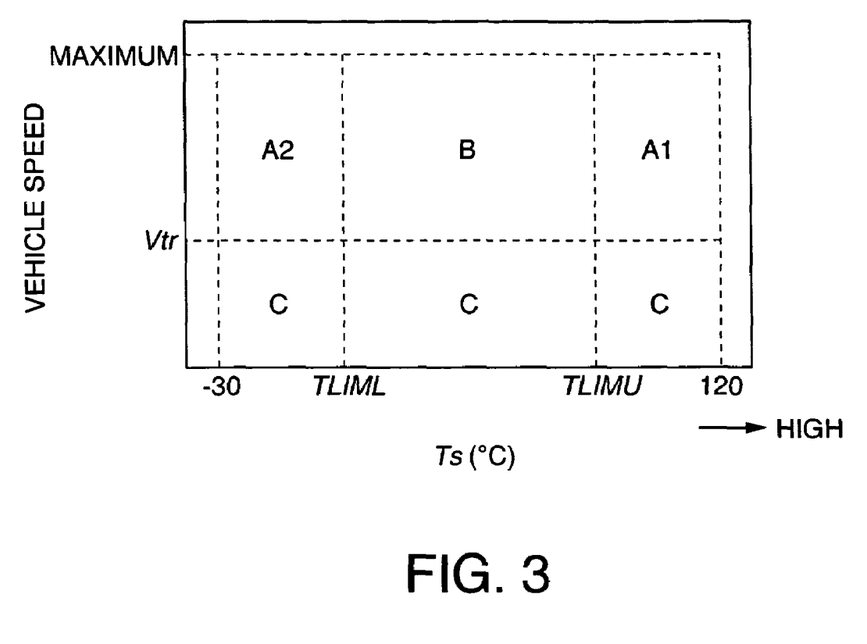
FIG. 3 is a diagram illustrating operating regions of a diesel engine, stored by the controller.

Referring to FIG. 3, to determine the method to be applied to estimation of the particulate matter deposit amount, the engine controller 11 divides the running conditions of the vehicle into regions A, A1, B, and C in accordance with a vehicle speed VSP and the ambient temperature of the differential pressure sensor 12.

When the vehicle speed does not exceed a predetermined estimation change-over vehicle speed Vtr, the running conditions of the vehicle are classified in the region C, regardless of the ambient temperature of the differential pressure sensor 12. In the region C, the engine controller 11 applies the accumulation method to estimate the particulate matter deposit amount in the DPF 4, rather than estimating the particulate matter deposit amount on the basis of the differential pressure. Typically, the estimation change-over vehicle speed Vtr takes a value in the range of fifty to seventy kilometers per hour. However, the estimation change-over vehicle speed Vtr differs according to vehicle conditions such as the amount of exhaust gas discharged from the diesel engine 1, and should therefore be determined to conform to the vehicle conditions.

When the vehicle speed exceeds the estimation change-over vehicle speed Vtr, the engine controller 11 executes particulate matter deposit amount estimation using a different method for each of the region A2, in which an ambient temperature Ts of the differential pressure sensor 12 is equal to or lower than the first predetermined temperature TLIML, the region A1, in which the ambient temperature Ts is equal to or higher than the second predetermined temperature TLIMU, and the region B, in which the ambient temperature Ts is positioned between the first predetermined temperature TLIML and second predetermined temperature TLIMU.

Figure 5:
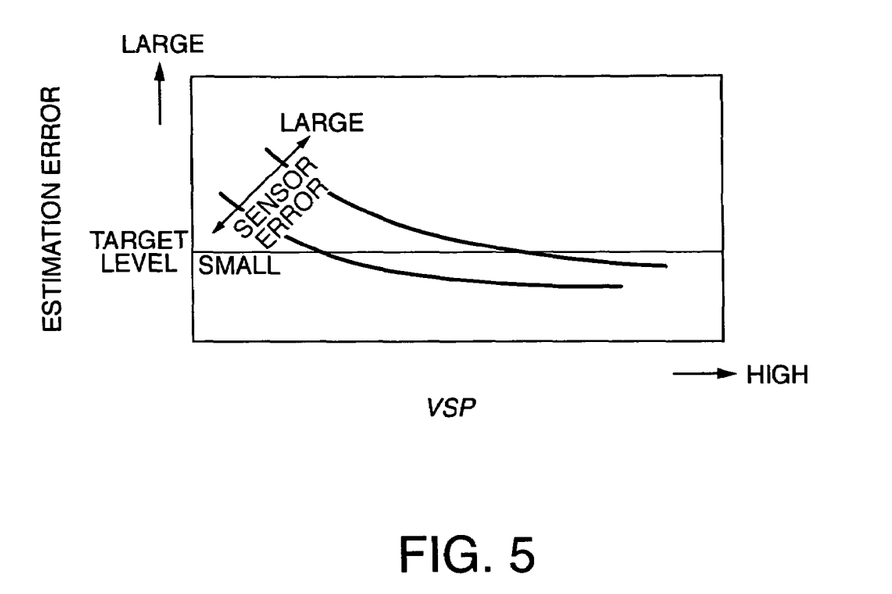
FIG. 5 is a diagram illustrating a relationship between a vehicle speed VSP and the detection error of the differential pressure sensor.

As can be seen from the diagram in FIG. 4, in the region B the differential pressure sensor 12 exhibits a favorable degree of differential pressure detection precision Moreover, referring to FIG. 5, the precision with which the particulate matter deposit amount is estimated using the differential pressure method improves as the vehicle speed VSP increases. The characteristic shown in FIG. 5 is well known, and the difference between the two curves in FIG. 5 indicates the range of error variation according to individual differences in differential pressure sensors.

Accordingly, in the region B the engine controller 11 applies the differential pressure method to estimate the particulate matter deposit amount.

In the region A1 and the region A2, on the other hand, the differential pressure detection precision of the differential pressure sensor 12 deteriorates. In these regions, the engine controller 11 corrects the estimation change-over vehicle speed Vtr upward so that the differential pressure method is applied to estimation of the particulate matter deposit amount in the DPF 4 only when the vehicle speed VSP exceeds the corrected estimation change-over vehicle speed.

The engine controller 11 performs regeneration of the DPF 4 on the basis of the estimated particulate matter deposit amount.

Figure 2:
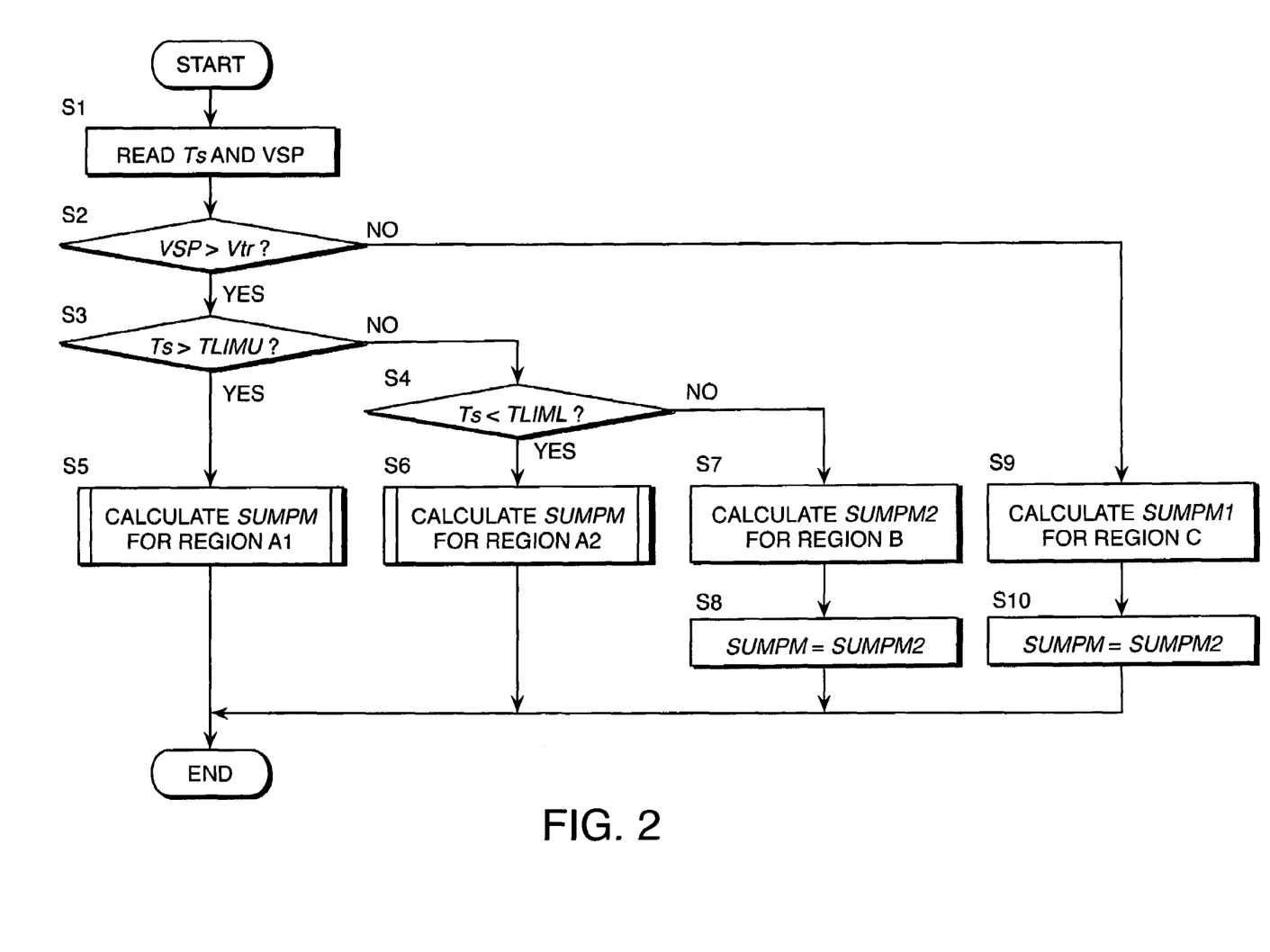
FIG. 2 is a flowchart illustrating a particulate matter deposit amount calculation routine executed by a controller according to this invention.

Next, referring to FIG. 2, a routine for estimating the particulate matter deposit amount in the DPF 4, executed by the engine controller 11, will be described in detail.

The engine controller 11 executes this routine at ten millisecond intervals while the diesel engine 1 is operative.

In a step S1, the engine controller 11 reads the ambient temperature Ts of the differential pressure sensor 12, detected by the temperature sensor 18, and the vehicle speed VSP, detected by the vehicle speed sensor 17.

In a step S2, the engine controller 11 determines whether or not the vehicle speed VSP exceeds the estimation change-over vehicle speed Vtr. When the vehicle speed VSP exceeds the estimation change-over vehicle speed Vtr, this indicates that the running conditions correspond to one of the regions A1, A2, B. When the vehicle speed VSP does not exceed the estimation change-over vehicle speed Vtr, this indicates that the running conditions correspond to the region C.

When the determination of the step S2 is negative, or in other words when the running conditions correspond to the region C, the engine controller 11 calculates a particulate matter deposit amount SUMPM in the DPF 4 in steps S9 and S10 using the accumulation method. More specifically, in the step S9 the engine controller 11 determines a particulate matter deposit amount $\Delta$PM in the DPF 4 per unit time from the load and a rotation speed N of the diesel engine 1 by referring to a map having the characteristics shown in FIG. 8, which is stored in the ROM in advance. The particulate matter deposit amount $\Delta$PM provided by the map takes a larger value as the engine load and rotation speed N increase. The unit time is set in advance to be equal to the routine execution interval. Using the determined particulate matter deposit amount ΔPM per unit time, the engine controller 11 calculates a particulate matter deposit amount SUMPM1 in the DPF 4 according to the accumulation method from the following equation (1).

$$SUMPM1 = SUMPM(old) + \Delta PM \quad (1)$$

where, SUMPM(old)=particulate matter deposit amount SUMPM calculated during execution of the previous routine.

Next, in the step S10, the engine controller 11 stores the particulate matter deposit amount SUMPM1 according to the accumulation method in the RAM as the particulate matter deposit amount SUMPM. Following the processing of the step S10, the engine controller 11 terminates the routine. It should be noted that when switching from the differential pressure method to the accumulation method, the particulate matter deposit amount calculated by the differential pressure method during the preceding execution of the routine is applied to SUMPM(old) in the equation (1).

Meanwhile, if the determination of the step S2 is affirmative, or in other words when the running conditions correspond to one of the regions A1, A2, and B, the engine controller 11 determines whether or not the ambient temperature Ts of the differential pressure sensor 12 is equal to or higher than the second predetermined temperature TLIMU in a step S3. When the ambient temperature Ts of the differential pressure sensor 12 is equal to or higher than the second predetermined temperature TLIMU, this signifies that the running conditions correspond to the region A2.

Figure 6:
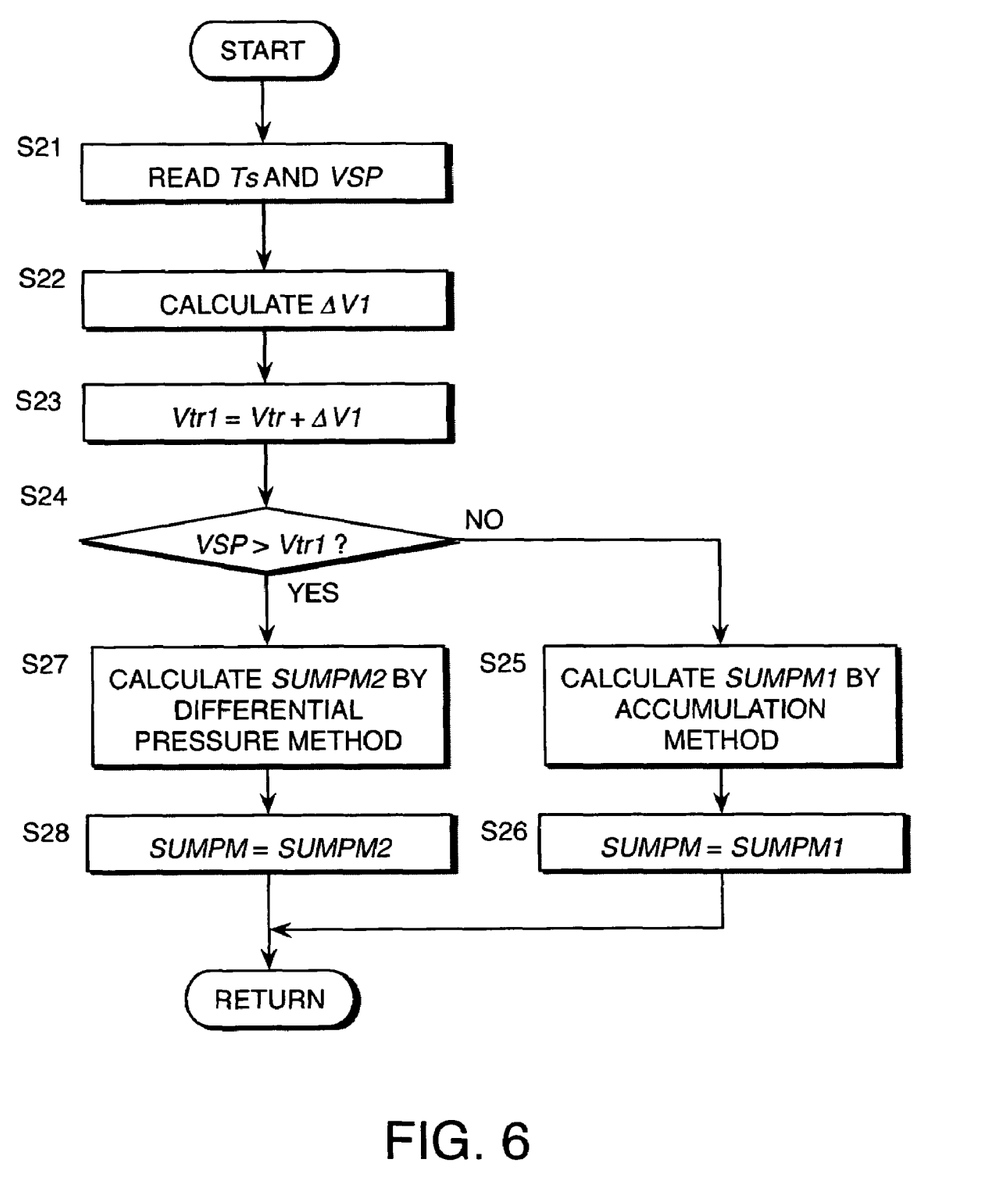
FIG. 6 is a flowchart illustrating a particulate matter deposit amount estimation sub-routine executed by the controller in an operating region A1.

In this case, the engine controller 11 calculates the particulate matter deposit amount SUMPM in the DPF 4 in a step S5 by executing a subroutine shown in FIG. 6 to estimate the particulate matter deposit amount in the region A1. Following the processing of the step S5, the engine controller 11 terminates the routine.

When the determination of the step S3 is negative, or in other words when the running conditions correspond to the region A1 or the region B, the engine controller 11 determines whether or not the ambient temperature Ts of the differential pressure sensor 12 is equal to or lower than the first predetermined temperature TLIML in a step S4. When the ambient temperature Ts of the differential pressure sensor 12 is equal to or lower than the first predetermined temperature TLIML, this signifies that the running conditions correspond to the region A1. In this case, the engine controller 11 calculates the particulate matter deposit amount SUMPM in the DPF 4 in a step S6 by executing a subroutine shown in FIG. 10 to estimate the particulate matter deposit amount in the region A2. Following the processing of the step S6, the engine controller 11 terminates the routine.

When the determination of the step S4 is negative, this signifies that the running conditions correspond to the region B. In this case, the engine controller 11 calculates the particulate matter deposit amount in the DPF 4 using the differential pressure method in steps S7 and S8. More specifically, in the step S7 the engine controller 11 first reads a differential pressure ΔP upstream and downstream of the DPF 4 detected by the differential pressure sensor 12, or in other words the pressure loss of the DPF 4. Further, the exhaust gas flow rate Qexh is calculated using the aforementioned well-known method. The engine controller 11 determines a particulate matter deposit amount SUMPM2 in the DPF 4 according to the differential pressure method from the pressure loss ΔP and the exhaust gas flow rate Qexh by referring to a map having the characteristics shown in FIG. 9, which is stored in the ROM in advance.

Next, in the step S8, the engine controller 11 stores the particulate matter deposit amount SUMPM2 in the DPF 4 according to the differential pressure method in the RAM as the particulate matter deposit amount SUMPM. Following the processing of the step S8, the engine controller 11 terminates the routine.

Next, referring to FIG. 6, the subroutine for estimating the particulate matter deposit amount in the region A1 will be described.

First, in a step S21, the engine controller 11 reads the ambient temperature Ts of the differential pressure sensor 12, detected by the temperature sensor 18, and the vehicle speed VSP, detected by the vehicle speed sensor 17.

Figure 7:
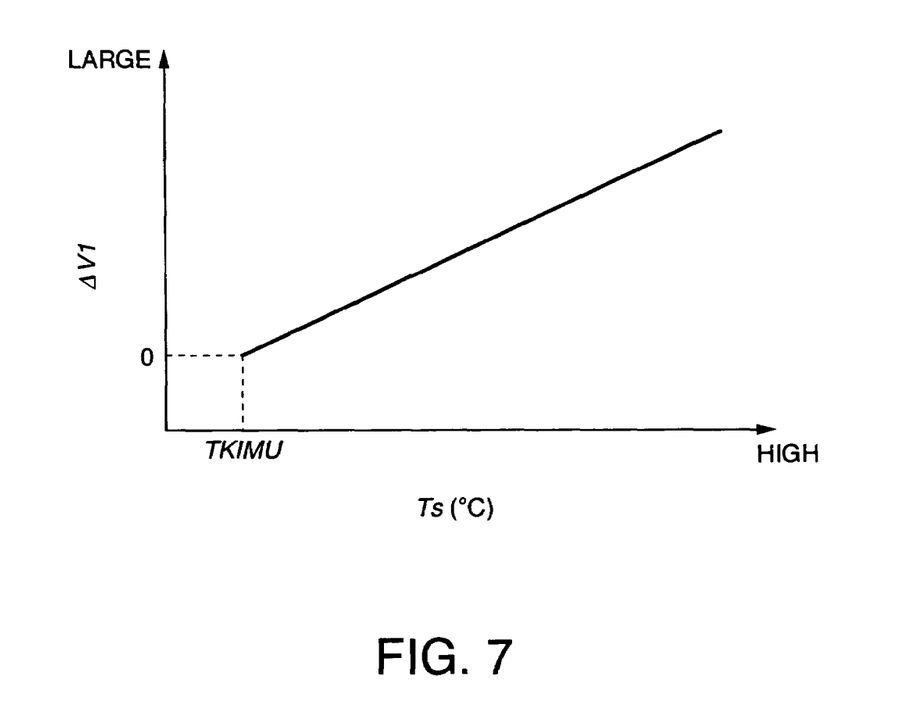
FIG. 7 is a diagram illustrating the characteristics of a map of an estimation change-over vehicle speed correction amount $\Delta V1$, stored by the controller.

Next, in a step S22, the engine controller 11 determines an increase correction amount ΔV1 of the estimation change-over vehicle speed from the ambient temperature Ts of the differential pressure sensor 12 by referring to a map having the characteristics shown in FIG. 7, which is stored in the ROM in advance. In this map, the increase correction amount ΔV1 takes a larger value as the ambient temperature Ts increases. This characteristic of the increase correction amount ΔV1 corresponds to the characteristic shown in FIG. 4, whereby the differential pressure detection error of the differential pressure sensor 12 increases as the ambient temperature Ts rises above the second predetermined temperature TLIMU.

Next, in a step S23, the engine controller 11 calculates a corrected estimation change-over vehicle speed Vtr1 by adding the increase correction amount ΔV1 to the estimation change-over vehicle speed Vtr.

Next, in a step S24, the engine controller 11 determines whether or not the vehicle speed VSP exceeds the corrected estimation change-over vehicle speed Vtr1. When the determination of the step S24 is affirmative, or in other words when the vehicle speed VSP exceeds the corrected estimation change-over vehicle speed Vtr1, the engine controller 11 calculates the particulate matter deposit amount SUMPM in the DPF 4 using the differential pressure method in steps S27 and S28. The processing of the step S27 is identical to that of the step S7, and the processing of the step S28 is identical to that of the step S8. Following the processing of the steps S27 and S28, the engine controller 11 terminates the subroutine.

When the determination of the step S24 is negative, or in other words when the vehicle speed VSP does not exceed the corrected estimation change-over vehicle speed Vtr1, the engine controller 11 calculates the particulate matter deposit amount in the DPF 4 using the accumulation method in steps S25 and S26. The processing of the step S25 is identical to that of the step S9, and the processing of the step S26 is identical to that of the step S10. Following the processing of the steps S25 and S26, the engine controller 11 terminates the subroutine.

Figure 10:
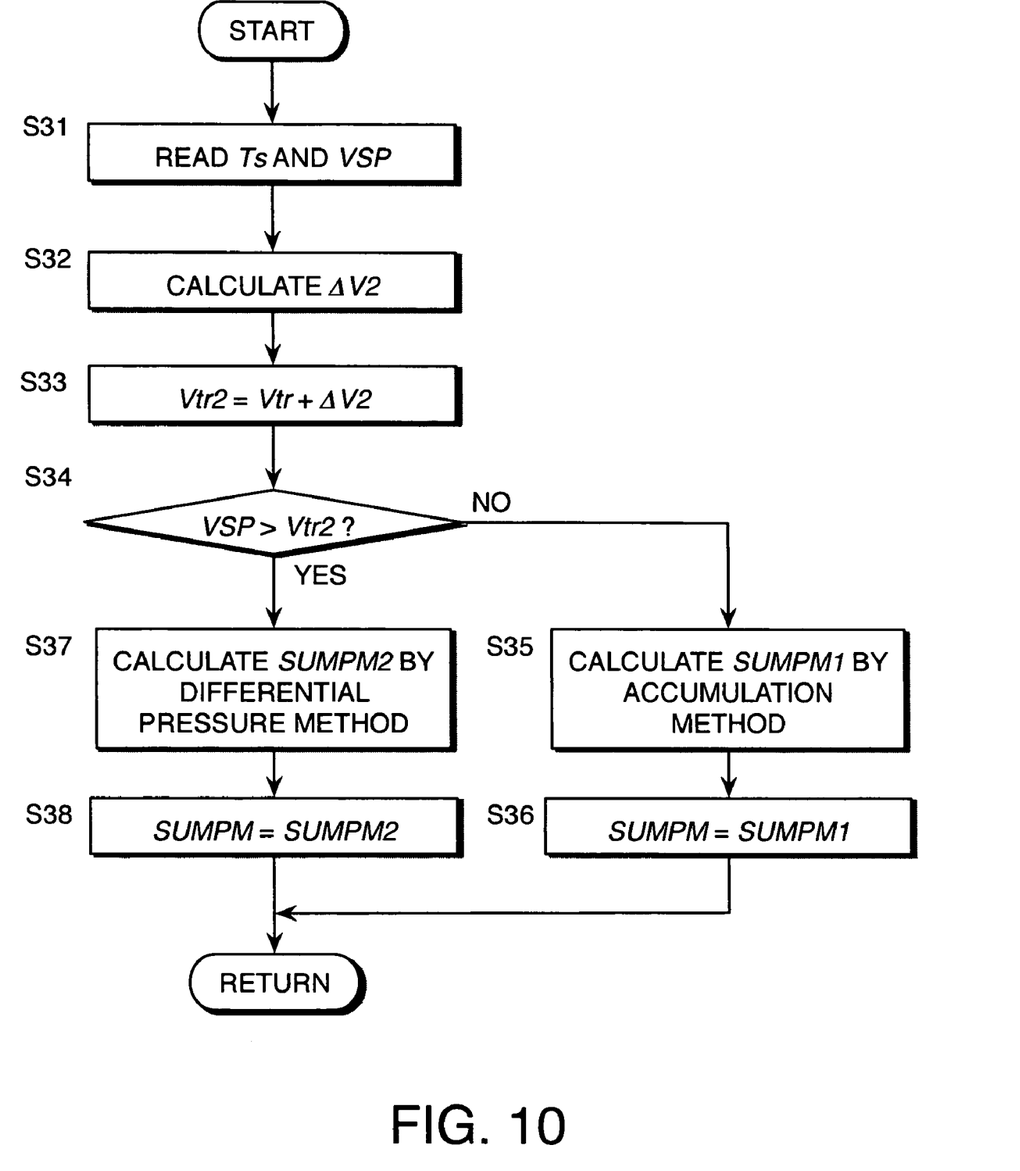
FIG. 10 is a flowchart illustrating a particulate matter deposit amount estimation sub-routine executed by the controller in an operating region A2.

Next, referring to FIG. 10, the subroutine for estimating the particulate matter deposit amount in the region A2 will be described.

First, in a step S31, the engine controller 11 reads the ambient temperature Ts of the differential pressure sensor 12, detected by the temperature sensor 18, and the vehicle speed VSP, detected by the vehicle speed sensor 17.

Figure 11:
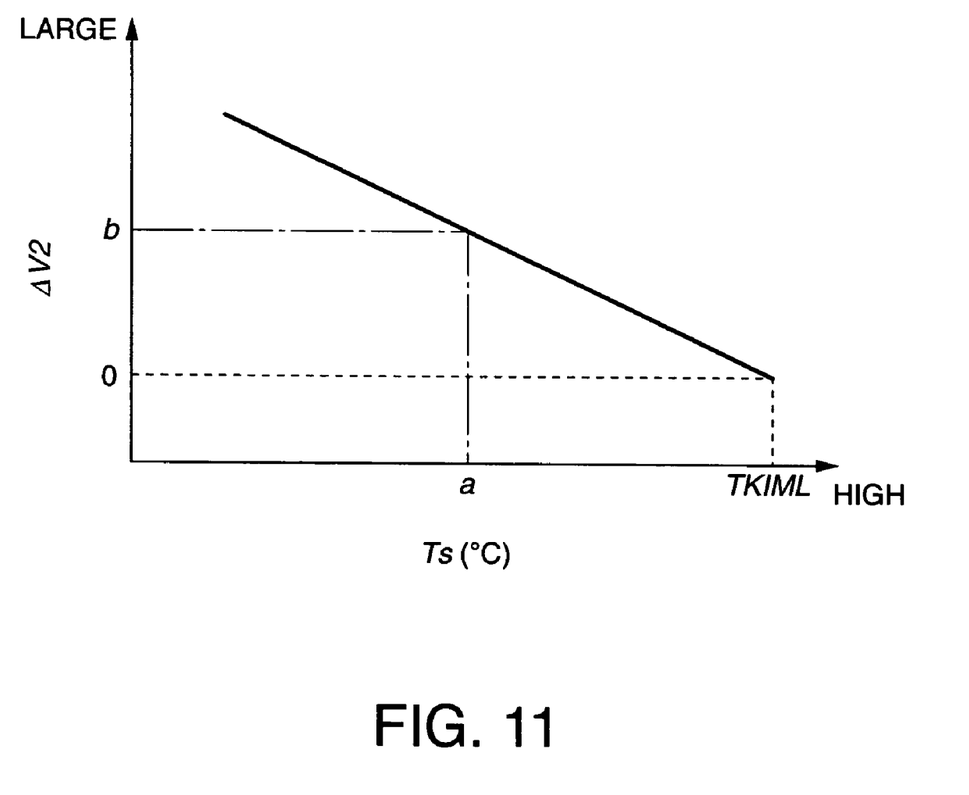
FIG. 11 is a diagram illustrating the characteristics of a map of an estimation change-over vehicle speed correction amount ΔV2, stored by the controller.

Next, in a step S32, the engine controller 11 determines an increase correction amount ΔV2 of the estimation change-over vehicle speed from the ambient temperature Ts of the differential pressure sensor 12 by referring to a map having the characteristics shown in FIG. 11, which is stored in the ROM in advance. In this map, the increase correction amount ΔV2 takes a larger value as the ambient temperature Ts decreases. This characteristic of the increase correction amount ΔV2 corresponds to the characteristic shown in FIG. 4, whereby the differential pressure detection error of the differential pressure sensor 12 increases as the ambient temperature Ts falls below the first predetermined temperature TLIML, and the characteristic shown in FIG. 5, whereby the estimation error of the particulate matter deposit amount decreases as the vehicle speed VSP increases.

Next, in a step S33, the engine controller 11 calculates a corrected estimation change-over vehicle speed Vtr2 by adding the increase correction amount ΔV2 to the estimation change-over vehicle speed Vtr.

Next, in a step S34, the engine controller 11 determines whether or not the vehicle speed VSP exceeds the corrected estimation change-over vehicle speed Vtr2. When the determination of the step S34 is affirmative, or in other words when the vehicle speed VSP exceeds the corrected estimation change-over vehicle speed Vtr2, the engine controller 11 calculates the particulate matter deposit amount SUMPM in the DPF 4 using the differential pressure method in steps S37 and S38. The processing of the step S37 is identical to that of the step S7, and the processing of the step S38 is identical to that of the step S8. Following the processing of the steps S37 and S38, the engine controller 11 terminates the subroutine.

When the determination of the step S34 is negative, or in other words when the vehicle speed VSP does not exceed the corrected estimation change-over vehicle speed Vtr2, the engine controller 11 calculates the particulate matter deposit amount in the DPF 4 using the accumulation method in steps S35 and S36. The processing of the step S35 is identical to that of the step S9, and the processing of the step S36 is identical to that of the step S10. Following the processing of the steps S35 and S36, the engine controller 11 terminates the subroutine.

Thus the particulate matter deposit amount in the DPF 4 is calculated using the method which corresponds to the regions A1, A2, B, and C. When the calculated particulate matter deposit amount reaches the predetermined amount, the engine controller 11 regenerates the DPF 4 by applying the aforementioned well-known method.

Next, referring to FIGS. 12A and 12B, variation in the particulate matter deposit amount SUMPM in the DPF 4, estimated by executing the above routine, will be described.

Herein, variation in the particulate matter deposit amount SUMPM of the DPF 4 when the vehicle starts and accelerates in the regions C and A2, where the ambient temperature Ts of the differential pressure sensor 12 is equal to or lower than the first predetermined temperature TLIML, will be described.

Immediately after the vehicle starts, the vehicle speed VSP is equal to or lower than the estimation change-over vehicle speed Vtr, and therefore the running conditions correspond to the region C. Accordingly, the engine controller 11 uses the accumulation method to calculate the particulate matter deposit amount SUMPM in the steps S9 and S10. The calculated particulate matter deposit amount SUMPM is held within an error range shown in FIG. 12B by the thick lines above and below the thin line showing the actual deposit amount. The upper thick line denotes an upper limit of fluctuation in the estimated deposit amount and the lower thick line denotes a lower limit of fluctuation in the estimated deposit amount.

The increasing vehicle speed VSP exceeds the estimation change-over vehicle speed Vtr at a time t1. Assuming that the ambient temperature Ts of the differential pressure sensor 12 at this time corresponds to a temperature a in FIG. 11 which is lower than the first predetermined temperature TLIML, the running conditions from the time t1 onward correspond to the region A2. Hence, from the time t1 onward, the engine controller 11 calculates the particulate matter deposit amount SUMPM in the step S6 using the subroutine in FIG. 10. More specifically, the engine controller 11 obtains from the map having the characteristics shown in FIG. 11 a correction amount b which serves as the increase correction amount ΔV2 of the estimation change-over vehicle speed corresponding to the temperature a.

Figure 12A:
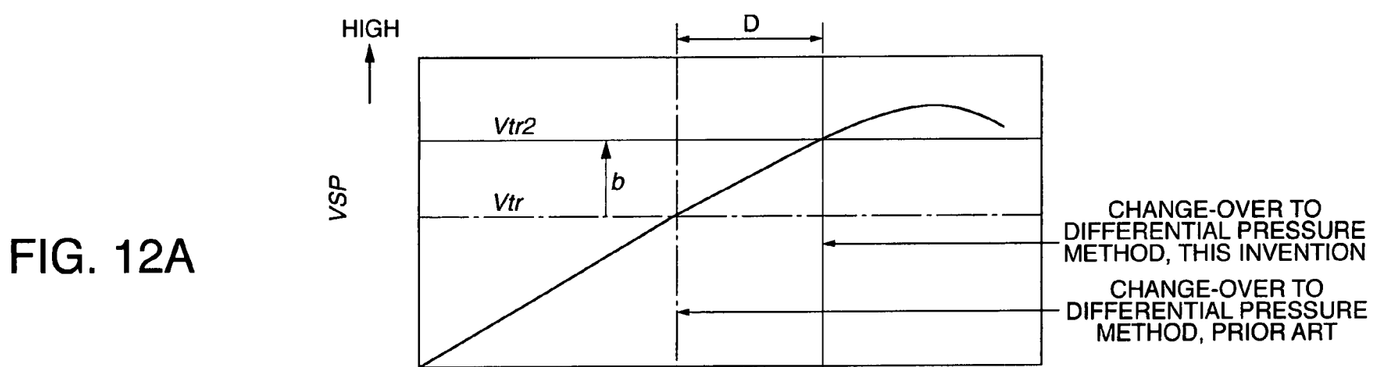
FIGS. 12A and 12B are timing charts illustrating execution results of the particulate matter deposit amount calculation routine.

The engine controller 11 then calculates the corrected estimation change-over vehicle speed Vtr2 by adding the correction amount b to the estimation change-over vehicle speed Vtr as shown in FIG. 12A, and calculates the particulate matter deposit amount SUMPM according to the accumulation method in the steps S35 and S36 until the vehicle speed VSP exceeds the corrected estimation change-over vehicle speed Vtr2. When the vehicle speed VSP exceeds the corrected estimation change-over vehicle speed Vtr2 at a time t2, the engine controller 11 calculates the particulate matter deposit amount SUMPM according to the differential pressure method in the steps S37 and S38 thereafter.

On the other hand, if the estimation change-over vehicle speed Vtr is not increased upward in accordance with the ambient temperature Ts of the differential pressure sensor 12 from the time t1 onward, when the running conditions switch from the region C to the region A2, and the estimation method is switched from the accumulation method to the differential pressure method as soon as the vehicle speed VSP exceeds the estimation change-over vehicle speed Vtr, the error range of the estimated amount SUMPM in relation to the actual deposit amount increases when the method is switched, as shown by the dotted line in the diagram.

This is due to the fact that when the ambient temperature Ts is low, the error range of the differential pressure sensor 12 expands as shown in FIG. 4. According to this invention, in the region A2 the estimation change-over vehicle speed Vtr is corrected upward by the increase correction amount ΔV2 corresponding to the ambient temperature Ts, and hence the differential pressure method is not applied until the time t2. As a result, the error range of the estimation amount SUMPM can be held within the error range of the accumulation method.

From the time t2 at which the vehicle speed VSP exceeds the corrected estimation change-over vehicle speed Vtr2 onward, the particulate matter deposit amount SUMPM is calculated using the differential pressure method. In this condition, as shown by the thick lines in FIG. 12B, the error range of the differential pressure method becomes narrower than the error range of the accumulation method shown by the broken line in the drawing.

Hence, switching from the accumulation method to the differential pressure method at the time t2 enables the estimation method having the narrower error range of the two estimation methods relating to estimation of the particulate matter deposit amount in the DPF 4 to be applied in accordance with the running conditions at all times. As a result, the particulate matter deposit amount estimation precision in a section D of FIG. 12A improves in comparison with a case in which the estimation change-over vehicle speed Vtr is not corrected upward.

Figure 12B:
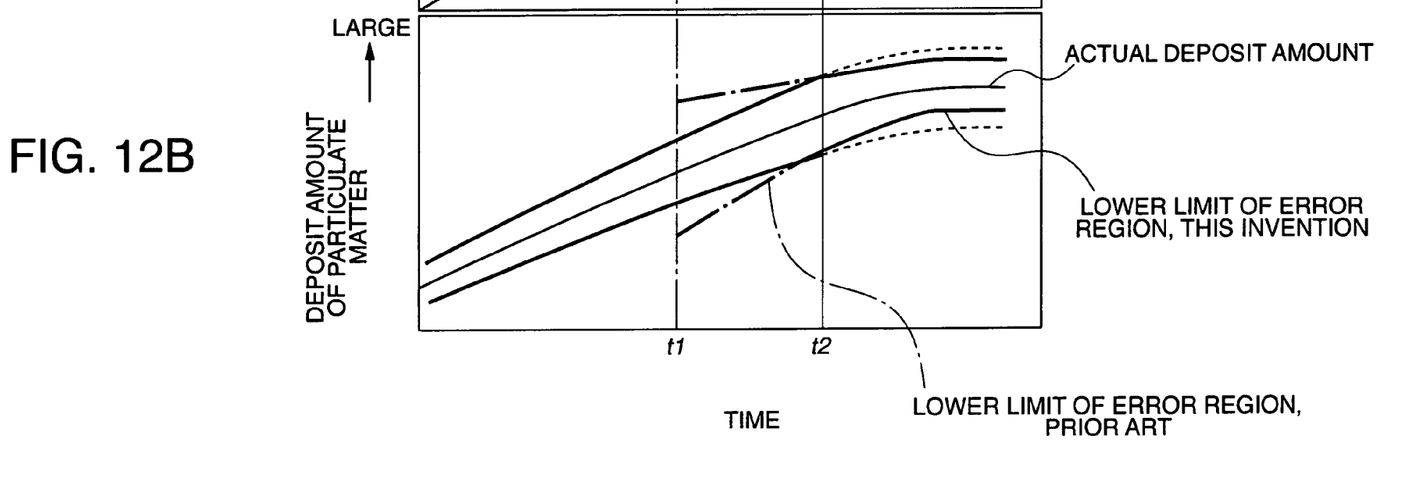

FIGS. 12A and 12B relate to the particulate matter deposit amount estimation error in the region A2, but likewise in the region A1, the estimation change-over vehicle speed Vtr is corrected upward using the increase correction amount ΔV1 corresponding to the ambient temperature Ts of the differential pressure sensor 12, and therefore here also, the estimation method having the narrower error range is applied in accordance with the running conditions at all times.

According to the DPF regeneration device described above, the particulate matter deposit amount in the DPF 4, which serves as a trigger for the implementation of regeneration, can be estimated with a high degree of precision regardless of the running conditions. As a result, the amount of energy consumed during DPF regeneration can be economized.

The contents of Tokugan 2004-230711, with a filing date of Aug. 6, 2004 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in the above embodiment, the ambient temperature Ts of the differential pressure sensor 12 is detected by the temperature sensor 18 provided specifically for this purpose in the vicinity of the differential pressure sensor 12, but the ambient temperature Ts of the differential pressure sensor 12 may be detected using a parameter having a correlation with the ambient temperature Ts such as the temperature inside the engine room, for example. In so doing the temperature sensor 18 may be omitted. It is also possible to incorporate a temperature sensor into the differential pressure sensor 12 and directly measure the temperature of the differential pressure sensor 12 instead of measuring the ambient temperature.

In the above embodiment, the parameters required for control are detected using sensors, but this invention can be applied to any particulate matter deposit amount estimation device which can perform the claimed processing using the claimed parameters regardless of how the parameters are acquired.

In the above embodiment, the estimation change-over vehicle speed Vtr is corrected upward in accordance with the ambient temperature Ts of the differential pressure sensor 12 in the regions A1 and A2, where the vehicle speed VSP exceeds the estimation change-over vehicle speed Vtr, but instead of correcting the estimation change-over vehicle speed Vtr upward, application of the differential pressure method may simply be prohibited in the regions A1 and A2 such that the particulate matter deposit amount in the DPF 4 is estimated using only the accumulation method in the regions A1 and A2.

The embodiments of this invention in which an exclusive property or privilege is claimed are defined as follows:

What is claimed is:

1. An estimation device which estimates a particulate matter deposit amount in a diesel particulate filter provided in an exhaust passage of a diesel engine, comprising:
    a differential pressure sensor which detects a pressure loss generated by the filter in an exhaust gas in the exhaust passage; and
    a programmable controller programmed to:
        estimate the particulate matter deposit amount on the basis of the pressure loss;
        determine whether or not a temperature of the differential pressure sensor is within a predetermined range;
        restrict estimation of the particulate matter deposit amount based on the pressure loss, when the temperature of the differential pressure sensor is not within the predetermined range; and
        estimate the particulate matter deposit amount by accumulating a particulate matter deposit amount per unit time when estimation of the particulate matter deposit amount based on the pressure loss is restricted.

2. The estimation device as defined in claim 1, wherein the diesel engine is an engine for driving a vehicle, the estimation device further comprises a sensor which detects a vehicle speed, and the controller is further programmed to restrict estimation of the particulate matter deposit amount based on the pressure loss when the vehicle speed is equal to or lower than a predetermined estimation change-over vehicle speed.

3. The estimation device as defined in claim 2, wherein the controller is further programmed to calculate a corrected estimation change-over vehicle speed by adding an increase correction amount corresponding to the temperature of the differential pressure sensor to the estimation change-over vehicle speed, and restrict estimation of the particulate matter deposit amount based on the pressure loss at a vehicle speed that is equal to or lower than the corrected estimation change-over vehicle speed, when the temperature of the differential pressure sensor is not within the predetermined range.

4. The estimation device as defined in claim 3, wherein the controller is further programmed to increase the increase correction amount as the temperature of the differential pressure sensor rises, when the temperature of the differential pressure sensor is higher than a predetermined range.

5. The estimation device as defined in claim 3, wherein the controller is further programmed to increase the increase correction amount as the temperature of the differential pressure sensor lowers, when the temperature of the differential pressure sensor is lower than a predetermined range.

6. The estimation device as defined in claim 1, wherein the estimation device further comprises a temperature sensor which detects an ambient temperature of the differential pressure sensor, and the controller is further programmed to determine whether or not the temperature of the differential pressure sensor is within the predetermined range on the basis of a detected value of the temperature sensor.

7. The estimation device as defined in claim 1, wherein the controller is further programmed to increase an estimated particulate matter deposit amount as the pressure loss increases, when the particulate matter deposit amount is estimated on the basis of the pressure loss.

8. The estimation device as defined in claim 7, wherein the controller is further programmed to increase the estimated particulate matter deposit amount as an exhaust gas flow rate in the exhaust passage increases.

9. The estimation device as defined in claim 1, wherein the controller is further programmed to set the particulate matter deposit amount per unit time in accordance with a load and a rotation speed of the diesel engine.

10. An estimation device which estimates a particulate matter deposit amount in a diesel particulate filter provided in an exhaust passage of a diesel engine, comprising:
    means for detecting a pressure loss generated by the filter in an exhaust gas in the exhaust passage;

means for estimating the particulate matter deposit amount on the basis of the pressure loss;

means for determining whether or not a temperature of the differential pressure sensor is within a predetermined range;

means for restricting estimation of the particulate matter deposit amount based on the pressure loss, when the temperature of the differential pressure sensor is not within the predetermined range;

means for estimating the particulate matter deposit amount by accumulating a particulate matter deposit amount per unit time when estimation of the particulate matter deposit amount based on the pressure loss is restricted.

11. An estimation method which estimates a particulate matter deposit amount in a diesel particulate filter provided in an exhaust passage of a diesel engine, comprising:

detecting a pressure loss generated by the filter in an exhaust gas in the exhaust passage;

estimating the particulate matter deposit amount on the basis of the pressure loss;

determining whether or not a temperature of the differential pressure sensor is within a predetermined range;

restricting estimation of the particulate matter deposit amount based on the pressure loss, when the temperature of the differential pressure sensor is not within the predetermined range; and estimating the particulate matter deposit amount by accumulating a particulate matter deposit amount per unit time when estimation of the particulate matter deposit amount based on the pressure loss is restricted.

* * * * *